UNITED STATES PATENT OFFICE.

MAX BAZLEN, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

PRODUCTION OF STABLE, DRY HYDROSULFITES.

No. 861,014.   Specification of Letters Patent.   Patented July 23, 1907.

Application filed April 22, 1905. Serial No. 256,990.

*To all whom it may concern:*

Be it known that I, MAX BAZLEN, a subject of the King of Würtemberg, residing at Ludwigshafen-on-the-Rhine, in the Kingdom of Bavaria, German Empire, have invented new and useful Improvements in the Production of Stable, Dry Hydrosulfites, of which the following is a specification.

In the specification of Letters Patent No. 795,755 a process is described for the production of stable hydrosulfites by heating the precipitated hydrosulfite salts (which contain water of crystallization and also free water) with liquids, or with vapors of liquids, which possess the power of taking up water. I have now discovered that hydrosulfites free from water of crystallization can be separated from their solutions in water by means of the above mentioned liquids, provided that the separation take place at a temperature such that the hydrosulfite in question loses its water of crystallization, this temperature varying with different hydrosulfites; for instance, when sodium hydrosulfite is precipitated by means of ethyl alcohol, the temperature at which the precipitation takes place should not be below fifty-five degrees centigrade (55° C).

The most convenient method of carrying out the operation is to heat the water-extracting liquid to above the required temperature and then to add, while well stirring, the hydrosulfite solution, taking care that the water-extracting liquid is in sufficient execss, since otherwise the hydrosulfite is not completely precipitated while hot, and on cooling, a further quantity containing water of crystallization separates out. For instance, one volume of saturated sodium hydrosulfite solution should be mixed with from three (3), to four (4), volumes of ninety-five (95) per cent. alcohol, so that the final mixture contains at least seventy (70) per cent. alcohol; the hydrosulfite then separates out in a granular form and free from water of crystallization. After filtering, which can be done by means of the pump in the presence of air, the product obtained can be preserved in the form of paste, or it can be dried *in vacuo* to a powder, a very stable product being obtained in either case. If a liquid be employed (such, for instance, as glycerin or amyl alcohol) which can only be evaporated with difficulty, it is preferable, before drying, to wash such liquid away with another liquid which is more easily evaporated, such for example, as alcohol.

The process according to my invention is preferable to that described in the aforesaid specification, since the precipitation from solution and the removal of water take place in one operation, whereas in the previous process these two operations were divided, the hydrosulfite being first precipitated from solution by means of for instance common salt, the precipitate was then filtered off in the absence of air and afterwards treated with alcohol, or other liquid, or vapor, in order to remove the water.

The following example will serve to further illustrate the nature of my invention, which, however, is not confined to this example. Heat three (3) volumes of ninety-five (95) per cent. alcohol in an enameled vessel to a temperature of from sixty, to seventy, degrees centigrade (60–70° C), and, while well stirring, add gradually one (1) volume of concentrated sodium hydrosulfite solution. When the addition is finished, continue stirring for half an hour (30 minutes), and allow the hydrosulfite to precipitate; then pour off the greater quantity of dilute alcohol and filter the solid hydrosulfite by the aid of the pump, or of a filter press. The product so obtained can be used as an alcoholic paste, or it can be washed with a liquid which easily evaporates, and then be dried *in vacuo* at a temperature of about seventy degrees centigrade (70° C).

Now what I claim is:

1. The process of obtaining hydrosulfites free from both combined and uncombined water from solutions of the same by reacting upon a solution of a hydrosulfite with a hot fluid which has the power of taking up water so that the hydrosulfite is precipitated at a temperature above fifty degrees centigrade.

2. The process of obtaining hydrosulfites free from both combined and uncombined water from solutions of the same by reacting upon a solution of a hydrosulfite with hot ethyl alcohol so that the hydrosulfite is precipitated at a temperature above fifty degrees centigrade.

In testimony whereof I have hereunto set my hand in the presence of two subscribing witnesses.

MAX BAZLEN.

Witnesses:
ERNEST F. EHRHARDT,
J. ALEC. LLOYD.